July 17, 1973     C. HARMON ET AL     3,746,607

SHEET MATERIAL

Filed July 7, 1970     7 Sheets-Sheet 1

July 17, 1973  C. HARMON ET AL  3,746,607
SHEET MATERIAL

Filed July 7, 1970  7 Sheets-Sheet 2

INVENTORS:
CARLYLE HARMON
WILLIAM SIBBACH
BY
ATTORNEY

July 17, 1973    C. HARMON ET AL    3,746,607
SHEET MATERIAL
Filed July 7, 1970    7 Sheets-Sheet 4

INVENTORS:
CARLYLE HARMON
WILLIAM SIBBACH
BY
ATTORNEY

July 17, 1973　　　C. HARMON ET AL　　　3,746,607
SHEET MATERIAL

Filed July 7, 1970　　　　　　　　　　　　　7 Sheets-Sheet 5

United States Patent Office 3,746,607
Patented July 17, 1973

3,746,607
SHEET MATERIAL
Carlyle Harmon, Scotch Plains, N.J., and William Sibbach, Longmeadow, Mass., assignors to Johnson & Johnson
Continuation-in-part of application Ser. No. 595,152, Nov. 17, 1966. This application July 7, 1970, Ser. No. 52,989
Int. Cl. B32b 3/10, 5/02
U.S. Cl. 161—109       7 Claims

ABSTRACT OF THE DISCLOSURE

A tear resistant sheet material having a soft, fibrous hand. The sheet material has a predetermined pattern of film areas of crystalline, orientable polymer. These film areas are interconnected by fibrous areas of substantially the same polymer and these film areas are substantially thicker than the fibrous areas. The fibrous areas have a multiplicity of fine fibers uniformly distributed throughout the area.

---

This application is a continuation-in-part application of our co-pending application Ser. No. 595,152, filed Nov. 17, 1966, now abandoned.

This invention relates to new sheet material, and more particularly, to sheet material combining plastic film and fibers into a unitary material and to methods for manufacturing such sheet material.

BACKGROUND OF INVENTION

For some time, plastic films have been produced with various patterns. Recently, methods have been developed for producing film materials having a pattern of nubs or bosses of film connected by biaxially oriented areas to form a pattern. These oriented areas for the most part are thick, rod-like sections and in some instances, may be considered monofilaments. These products, while having a pleasing appearance, are still plastic in nature and lack a soft hand and have relatively poor drape.

Another recent technique for changing the properties of a plastic film is to highly orient the film, uniaxially, and then split the film into fine fibers. While this technique may provide suitable softness and hand in the product, its strength transverse to the direction of orientation is very poor and the material will readily tear in the direction of orientation.

The sheet material of the present invention overcomes many of the above-mentioned shortcomings. Our new product has a soft hand while having strength and tear resistance in both the longitudinal and transverse directions or other directions of the product.

SUMMARY OF THE INVENTION

The sheet material of the present invention comprises a plurality of areas of plastic film arranged in a predetermined pattern. The plastic film areas may be oriented or unoriented or a combination of oriented and unoriented plastic film. Adjacent areas of plastic film are connected by a plurality of fibrous areas to form a unitary sheet material. The fibrous areas lie in the same general plane as the plastic film areas.

The plastic film areas are distributed throughout the sheet material in a predetermined pattern. The size of the areas may vary over a wide range, and it is preferred that if the film areas are unoriented, the pattern be intermittent, that is, an unoriented area does not extend entirely across the width of the web or entirely along the length of the web. If the plastic film area is oriented, it may be desirable to have the oriented areas extend fully along the length of the web or fully across the width of the web to provide great strength in the final sheet material. The film areas may take various shapes, such as, circles, squares, hexagonals, rectangles, or other multi-sided figures. The size, shape, and distribution of the plastic film areas will determine to a great extent the method by which the sheet material of the present invention may be produced as will be more fully described hereinafter.

The film areas are connected by fibrous areas and depending upon the pattern of film areas, the film areas may be connected to all surrounding film areas or only to specific adjacent film areas. The fibrous areas comprise a plurality of small fibers extending from one film area to another film area. These fibrous areas contain a multiplicity of fine fibers substantially uniformly distributed throughout the area. The individual fibers in the area have a denier of less than 10 and preferably have a denier of about 1 or lower. The fibrous areas lie in the same plane as the film areas. The film areas are thicker than the individual fibers though because of the fluffiness of the fine fibers, the fibrous areas may have substantial apparent thickness. If the film areas are unoriented, they may be substantially thicker than the fibrous areas.

The length of the fibers will depend upon the distance between film areas and a fiber may cover this full length or it may be somewhat shorter than this distance. Generally, fibers will be of substantially the same polymeric composition as the film areas though in certain methods of the present invention, there may be slight modifications in the polymeric compositions of the film areas and the fibrous areas.

In one modification of the sheet material of the present invention, unoriented film areas may be connected by oriented film areas and also be connected by fibrous areas. The oriented areas may be either uniaxially oriented or biaxially oriented, again dependent on the method for manufacturing the sheet material of the present invention.

As the present description progresses, it will become apparent that there are innumerable variations, permutations, and computations of oriented plastic film areas and/or unoriented plastic film areas and fibrous areas which may be combined to produce sheet material according to the present invention.

In manufacturing the sheet materials of the present invention, a plastic film is treated to provide the film with a predetermined pattern of areas which will resist orientation to a greater extent than the remainder of the film. Stretching forces are applied to the film in one or more directions. The force applied is of a magnitude such as will highly orient portions of the film but not of sufficient magnitude to fully orient those areas of the film treated to resist orientation. The patterned oriented film is then fibrillated or treated to split the highly oriented sections into individual fibers. This treatment may be given to the entire area, or it may be given to the film in a pattern so that only certain highly oriented areas are fibrillated or split into fibers as will be more fully described hereinafter.

The oriented area to be fibrillated must be oriented sufficiently to be brittle. If an unmodified polypropylene material is used, it should be oriented at a ratio of 9 to 10 to 1 or higher in order to be fibrillatable. This stretch ratio may be reduced somewhat by modifying the polypropylene by foaming or adding material to increase its brittleness. It is believed that the highly oriented material is fibrillatable because of the ratio of crystalline to amorphous portions. By reducing the amorphous portions, the crystalline portion is not held together sufficiently and hence, is readily fibrillatable. Another technique to produce fibrillatable areas is to make the area thin enough so that many fine crystals are formed in the area and the ratio of crystalline to amorphous portions is increased.

If desired, a film may be treated a number of times to give the film various areas having different degrees of resistance to orientation so that when stretched and fibrillated, there remain unoriented areas and also oriented areas which have not been oriented to the extent, wherein, they are capable of being split into fibers or fibrillated. The forces to produce orientation may be applied to the film in one or more directions, and the forces to fibrillate or split the film may also be applied in one or more directions.

The sheet material of the present invention may be made from any of the plastic materials which readily form films and are orientable to the degree that they readily form fibers. These plastic materials have a high molecular weight, a long chain molecular structure and are crystalline. Suitable examples are the polyolefins, such as polyethylene and polypropylene or copolymers thereof, polyamides, polyesters, etc. The type of polymer used will have considerable influence on the methods used in producing the sheet material of the present invention.

BRIEF DESCRIPTION OF THE DRAWINGS

The invention will be more fully described in conjunction with the accompanying drawings, wherein.

DETAILED DESCRIPTION OF THE DRAWINGS

Figures 1, 2:
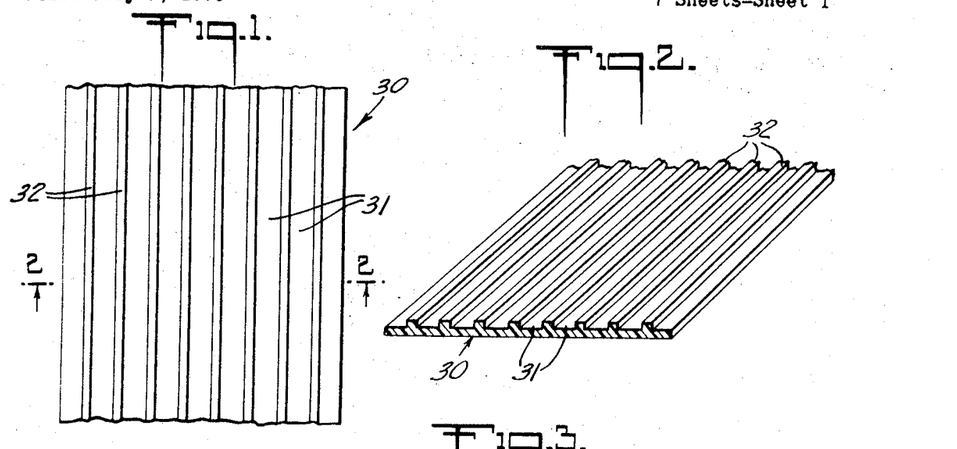
FIG. 1 is a plan view of a suitable starting material from which a product of the present invention may be produced.
FIG. 2 is a cross sectional view taken along line 2—2 of FIG. 1.
Figure 3:
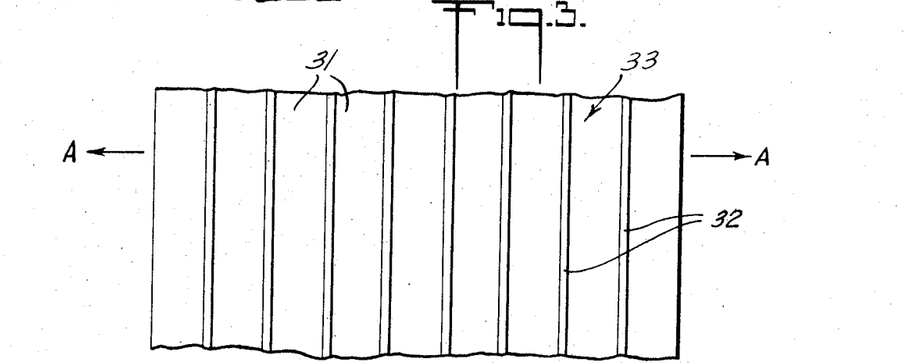
FIG. 3 is the starting material of FIG. 1 after it has been treated by stretching in the transverse direction.

Referring to the drawings, FIGS. 1 and 2, there is shown a plastic film 30 which may be oriented upon stretching. The film is cast with thin areas 31 and thick areas 32 in the film with the thicker areas being narrow longitudinal ribs. The film is preferably heated to below the melting point of the polymer and is stretched in a transverse direction (arrow A) to produce the film 33 depicted in FIG. 3. The thicker narrow longitudinal ribs 32 remain unoriented, whereas, the wider thin channels 31 have become oriented in the transverse direction.

Figure 4:
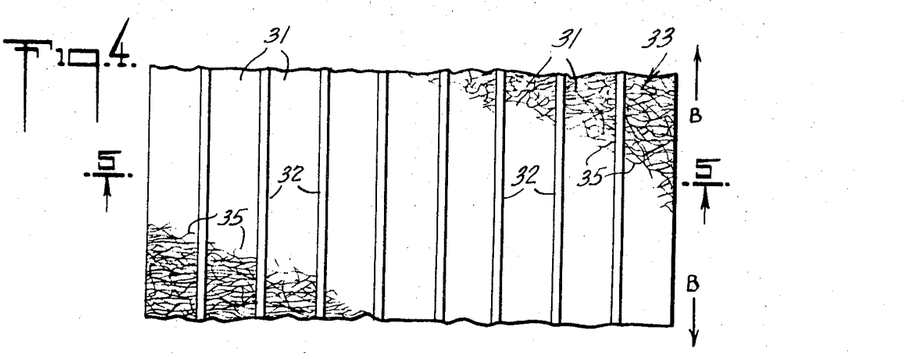
FIG. 4 is a plan view of the material of FIG. 3 after splitting forces have been applied to the material in the longitudinal direction.
Figure 5:
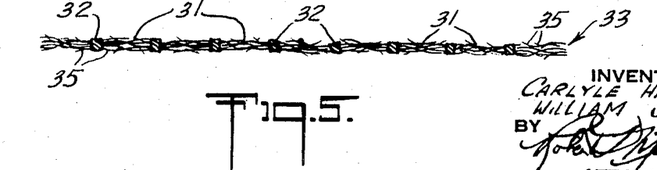
FIG. 5 is a cross sectional view taken along line 5—5 of FIG. 4.

As shown in FIGS. 4 and 5 repeated intermittent forces have been applied in the longitudinal direction (arrow B) of the film 33 to break, crack and fibrillate the oriented areas 31 and produce the fibers or split fibers 35 without affecting the unoriented thick ribs 32. The unoriented areas are connected to adjacent unoriented areas by fibers which extend between areas. There are also considerable fibers which do not extend the full distance between areas but only partially cover the distance to produce a fluffy and bulkiness between areas.

Figure 6:
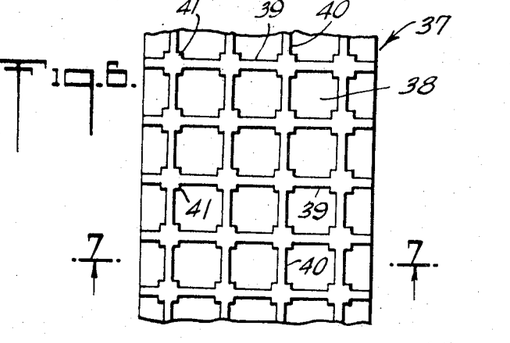
FIG. 6 is a plan view of another type of starting material from which products of the present invention may be produced.
Figure 7:
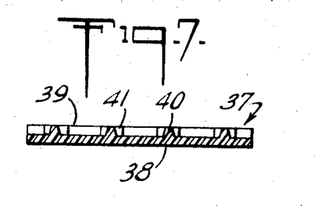
FIG. 7 is a cross sectional view taken along line 7—7 of FIG. 6.
Figure 8:
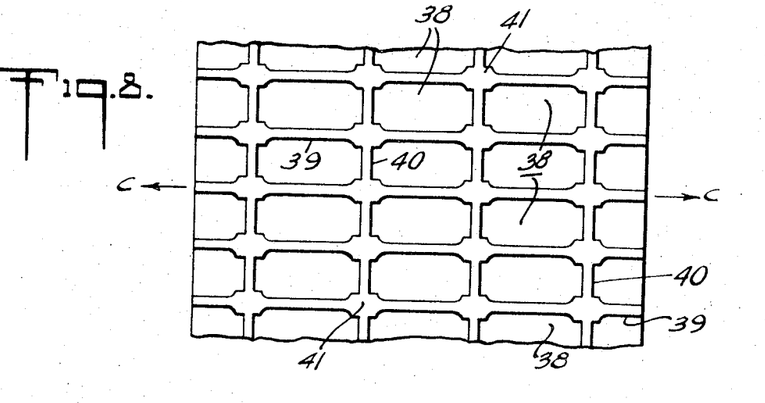
FIG. 8 is a plan view of the material of FIG. 6 after it has been stretched in the transverse direction.
Figure 9:
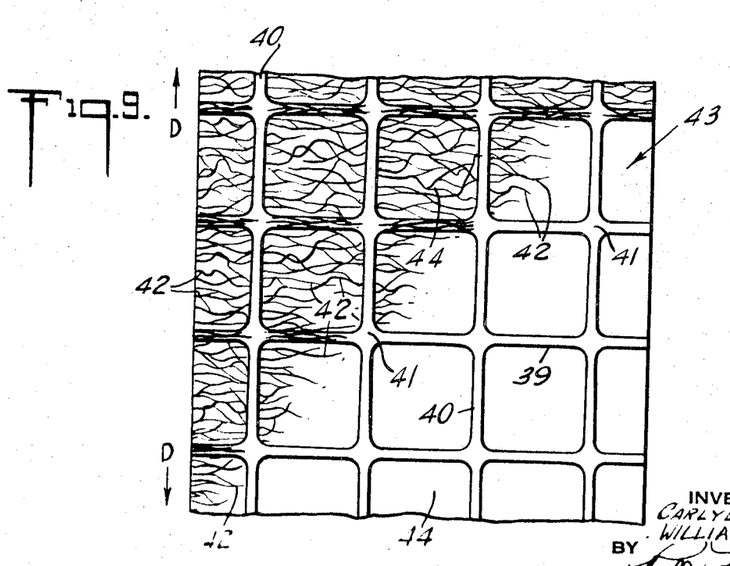
FIG. 9 is a plan view of the material of FIG. 8 after that material has had splitting forces applied and been stretched in the longitudinal direction.

Referring to FIGS. 6 and 7 there is shown another plastic film 37 capable of being oriented when stretched which is cast in a different pattern and which may be used to produce the products of the present invention. The film comprises thin square areas 38 and thicker transverse ribs 39 and longitudinal ribs 40 with square areas 41 at each of the intersections of these ribs. In FIG. 8, the film of FIG. 6 has been stretched in the transverse direction (arrow C) to highly orient the thin areas 38 and orient the thick transverse ribs 39 with no orientation in the longitudinal ribs 40 and with little orientation at the intersection. The film is treated with longitudinal splitting forces to split the highly oriented areas. The thin areas 38 are split into fine fibers 42, whereas, the thick transverse ribs 39, if split, form coarser fibers. The film is heated slightly and stretched in the longitudinal direction (see arrow D FIG. 9) to orient the thick longitudinal ribs 40, further orient the intersections 41, and open the fibrous areas 44 to produce the fabric 43 as shown in FIG. 9. The fabric comprises substantially oriented transverse ribs of coarse fibers 39, longitudinal oriented ribs 40 and partially oriented areas 41 where the transverse and longitudinal ribs intersect, with panes of open fibrous areas 44 connecting the film areas.

Figure 10:
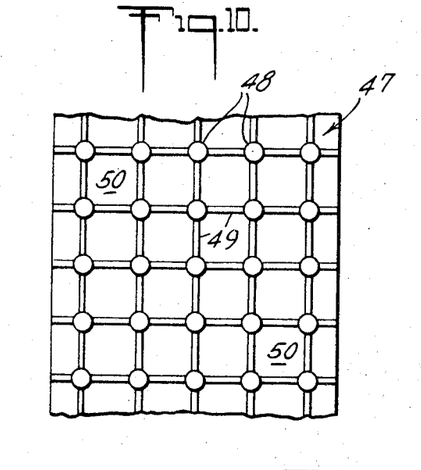
FIG. 10 is still another type of starting material from which products of the present invention may be produced.
Figure 11:
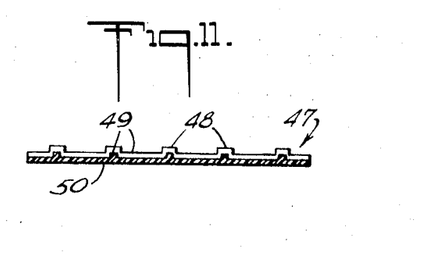
FIG. 11 is a cross sectional view taken along line 11—11 of FIG. 10.
Figure 12:
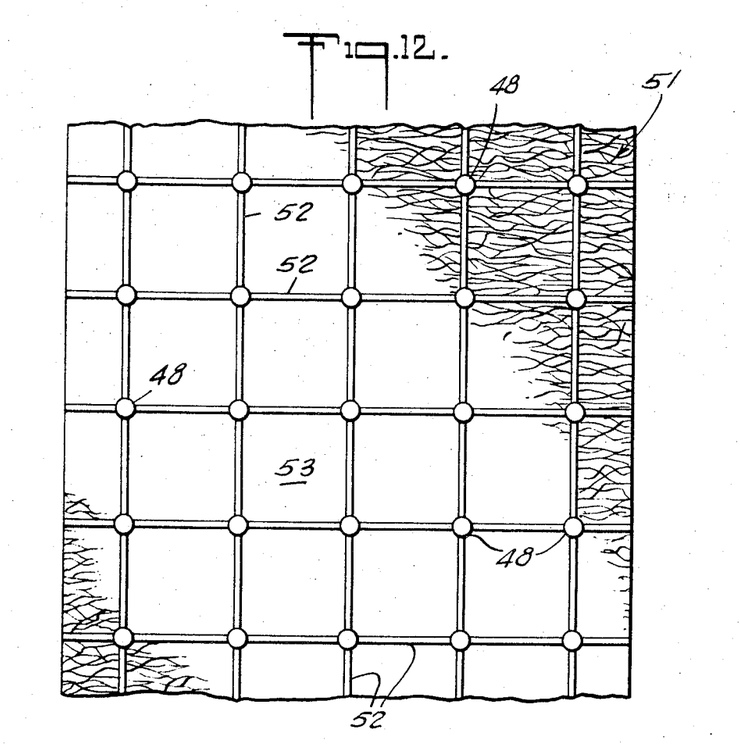
FIG. 12 is a plan view of a product according to the present invention produced in accordance with the methods of the present invention.

Referring to FIGS. 10 and 11, there is shown yet another plastic film 47 which may be used in accordance with the present invention to produce the products of this invention. In this film there are thick areas of dots 48 arranged in transverse and longitudinal rows. Connecting these dots in both the transverse and longitudinal direction are thinner ribs 49. In the area defined by these ribs and dots is yet a thinner plastic film 50. When this film 47 is stretched both in the cross and long direction and fibrillated in accordance with the present invention, a fabric 51 as depicted in FIG. 12 is produced. The fabric comprises dots of unoriented plastic film 48 arranged transverse and longitudinal of the fabric. These dots are connected by ribs of oriented film 52 running both in the longitudinal direction and in the transverse direction. The ribs are substantially oriented in the major dimension of the rib, and in some instances may be made of coarse fibers. The ribs define fibrous areas 53.

Figure 13:
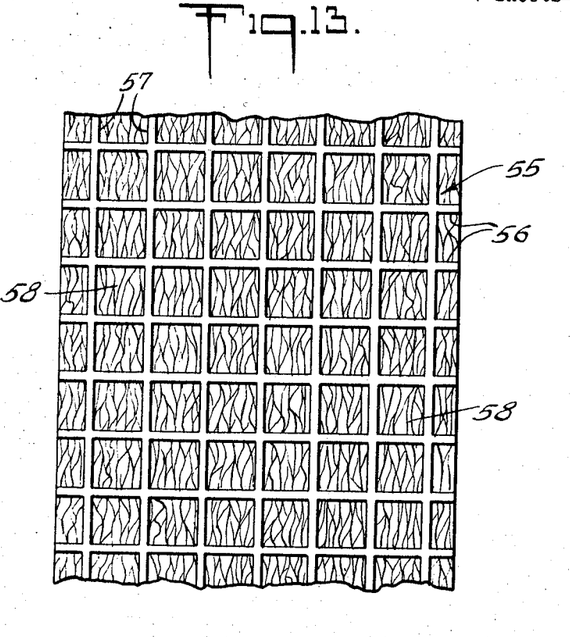
FIG. 13 is a plan view of another product of the product of the present invention.
Figure 14:
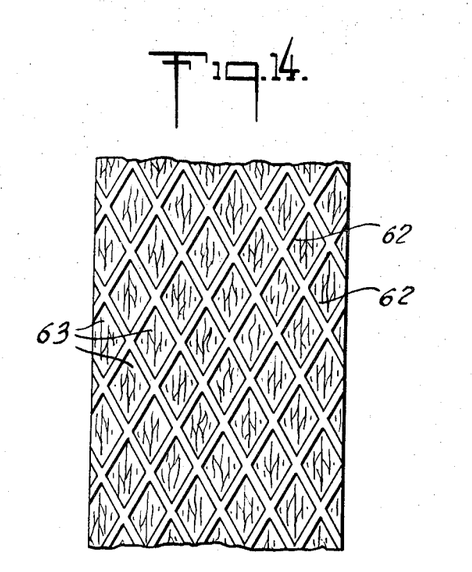
FIG. 14 is a plan view of another embodiment of the product of the present invention.

Referring to FIG. 13 there is shown sheet material 55 of the present invention comprising thick ribs 56 running transversely of the sheet material which are unoriented film. There are thick ribs 57 connecting the transverse lines which are substantially uniaxially oriented or may comprise coarse fibers and within the ribs are fibrous areas 58. In FIG. 14 there is shown still another embodiment of the product of the present invention in which there are biaxially oriented thick film ribs 62 extending diagonally across the fabric in opposite directions with the area 63 defined by these ribs being fibrous in nature.

Sheet material as shown in FIG. 13 may be produced from a suitable film embossed or cast to produce thicker transverse and longitudinal lines. The film is stretched in the longitudinal direction to orient the thin area longitudinally and also orient the thicker longitudinal ribs.

When splitting forces are applied to this film, the oriented areas form coarse fibers in the thick areas and fine fibers in the thin areas to produce the final product.

With regard to FIG. 14, the product as depicted may be produced from a film in which the diagonal ribs are thicker than the area surrounded by the ribs. The film is stretched lengthwise, fibrillated, and stretched in the transverse direction to produce the product described in accordance with FIG. 14.

Figure 15:
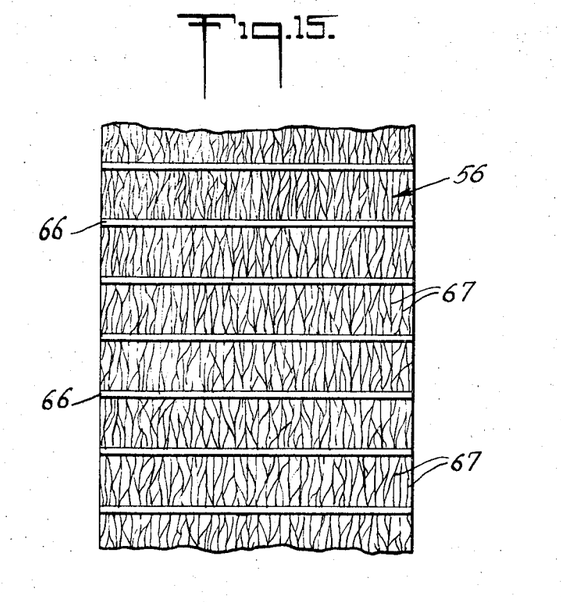
FIG. 15 is a plan view of a product of the present invention.

In FIG. 15, there is shown a product 65 of the present invention in which there are transverse lines 66 of highly oriented film which are connected by very open fiber areas 67. This fabric may be produced from a film embossed or cast to produce thicker transverse lines and which is stretched longitudinally to orient the thinner areas between the thick lines in the longitudinal direction. Fibrillating or splitting forces are applied in a transverse direction to form the highly oriented thin areas into fibers. The film is stretched in the transverse direction which orients the thicker lines and opens the fibrous areas to produce the product described in accordance with FIG. 15.

Figure 16:
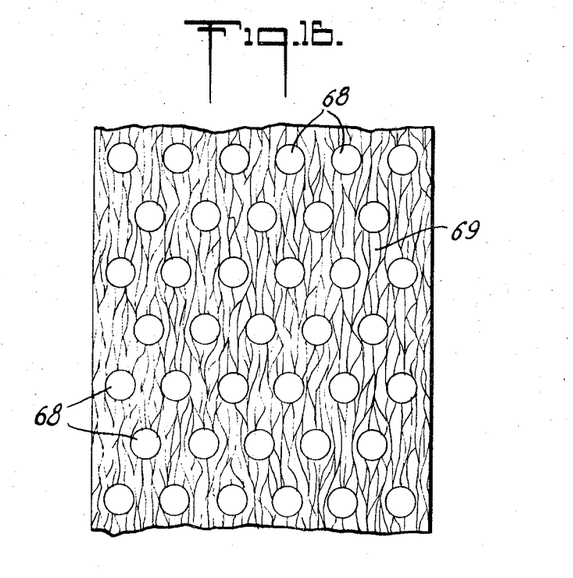
FIG. 16 is a plan view of the product of the present invention.

Referring to FIG. 16, there is shown yet another embodiment of the present invention comprising circular areas 68 of unoriented film arranged in staggered rows and connected to adjacent circular areas by fibrous areas 69 to form a unitary fabric. This product may be produced by orienting a film of uniform thickness, longitudinally to a high degree of orientation, applying heat in the pattern of the circular areas to reduce the orientation of these areas and then submitting the film to transverse fibrillating or splitting forces to change the oriented areas into fibrous areas to produce the product described in accordance with FIG. 16.

The polymers which may be used to produce the sheet materials of the present invention may be any of the orientable, crystalline film forming polymers. These are usually synthetic, organic polymers of high molecular weight with long chain molecules and are thermoplastic in nature. Suitable examples of such polymers are the polyolefins, such as, polyethylene and polypropylene, the polyamides, the polyurethanes, the polyesters and polyethers, copolymers of these various long chain polymers or mixtures of these polymers including mixtures of non-compatible polymers and mixtures with foreign substances such as clay, sand, etc. which may be added to aid in the splitting operation. The important thing is that the polymer must be film-forming and must have a capacity, wherein, the molecules are capable of being oriented upon proper treatment. This orientation is important in order to produce fibrous areas in the new types of sheet material of the present invention.

In all instances the sheet materials of the present invention will contain fibrous areas, that is, areas where the polymer is in the fiber-form. The fibers in the sheet material are of a rectangular cross section and of a random denier ranging anywhere from tenths of a denier up to 10 denier. The fibrous areas may be quite open and in some instances, the sheet material may even have holes depending upon the degree of orientation, fibrillation and stretching given the sheet material and whether such stretching is carried out before or after fibrillation.

In all instances in the sheet materials of the present invention, the fibrous areas will be connected by either unoriented areas or oriented areas of the synthetic polymer to form a unitary fabric. These synthetic polymer areas may be either completely unoriented or have varying degrees of either uniaxial or biaxial orientation up to a very highly oriented form. It is extremely important that there be such unoriented or oriented areas in order to stop the formation of fibers and prevent the sheet material from splitting either along its entire length or its entire width.

The various patterns which may be used of oriented and/or unoriented areas as compared to fibrous areas may vary widely. They may be transverse or longitudinal lines, dots, rectangles, squares, or various combinations of the same. The important thing is that if the fibers are running longitudinally, there must be either oriented or unoriented film areas running transverse of the sheet material to prevent splitting of the material in the longitudinal direction, and if the fibers are oriented in the transverse direction, there must be unoriented or oriented areas running longitudinal of the fabric to prevent the sheet material from splitting in the transverse direction. If the oriented and unoriented areas are not continuous, then they should be in a staggered over-lapping pattern as in FIG. 16 to help prevent splitting.

The properties of the products of the present invention may vary over wide limits dependent upon the combination of oriented, unoriented and fibrous areas used. The fibrous areas, of course, produce porosity in the sheet materials along with producing the soft, fluffy hand occurring with fibers. The fibers also being highly oriented will impart strength to the film in the direction of their orientation. If the sheet material was entirely fibrous, it would be readily susceptible to tearing perpendicular to the direction of the orientation of fibers. The oriented areas have high tear resistance perpendicular to the direction of orientation and hence, provide the sheet material with stop areas to prevent the fibrous areas from splitting or tearing the entire length or width of the fabric. The oriented areas also provide strength in the final fabric in the direction of their orientation. The unoriented areas also provide the stop area or area which prevents tearing.

The sheet materials of the present invention have various uses and may be used many places where woven or nonwoven fabrics are presently used. The sheet materials may be used as the wrapping for absorbent media, such as in a sanitary napkin or surgical dressing. In such a use, the fibrous area being porous allows material to be absorbed by the absorbent mass. As most of the linear polymers do not adhere to a wound when the material of the present invention is used as a covering for a dressing, the resultant dressing is nonadherent. The sheet materials of the present invention, being inert and highly resistant to weathering, may be used as seed bed covers or for other outdoor uses. When a thermoplastic polymer is used in the formation of the sheet material, the resultant product could be used as an adhesive member for the lamination of fabrics, etc. They may also be used as packaging materials, backing for carpeting, decorative purposes, such as curtains and drapes, apparel, etc.

The general process for producing the product of the present invention comprises three basic steps as follows: (1) producing a film in which there are patterned areas having different stretch or orientation properties, (2) stretching the film to orient the film in a pattern of areas, and (3) fibrillating or splitting the film in a pattern. These three basic steps may be combined in various manners and sequence and one or more of the steps may be repeated one or more times. The various combinations of the process of the present invention may be more clearly understood when taken in conjunction with the flow sheet depicted in FIG. 17. In the process of the present invention, the starting material is a suitable film-forming polymer (box 1) as previously described. Initially, a film is formed, and the film may be of two thicknesses (box 2), three or more different thicknesses (box 3), or it may be of a uniform thickness (box 4). The thicker areas are formed in a pattern as previously described, and the film may be formed by casting on an embossed roll or if a uniform film is desired, by a tubular blown film extrusion or any of the various known methods of forming plastic films.

Figure 17:
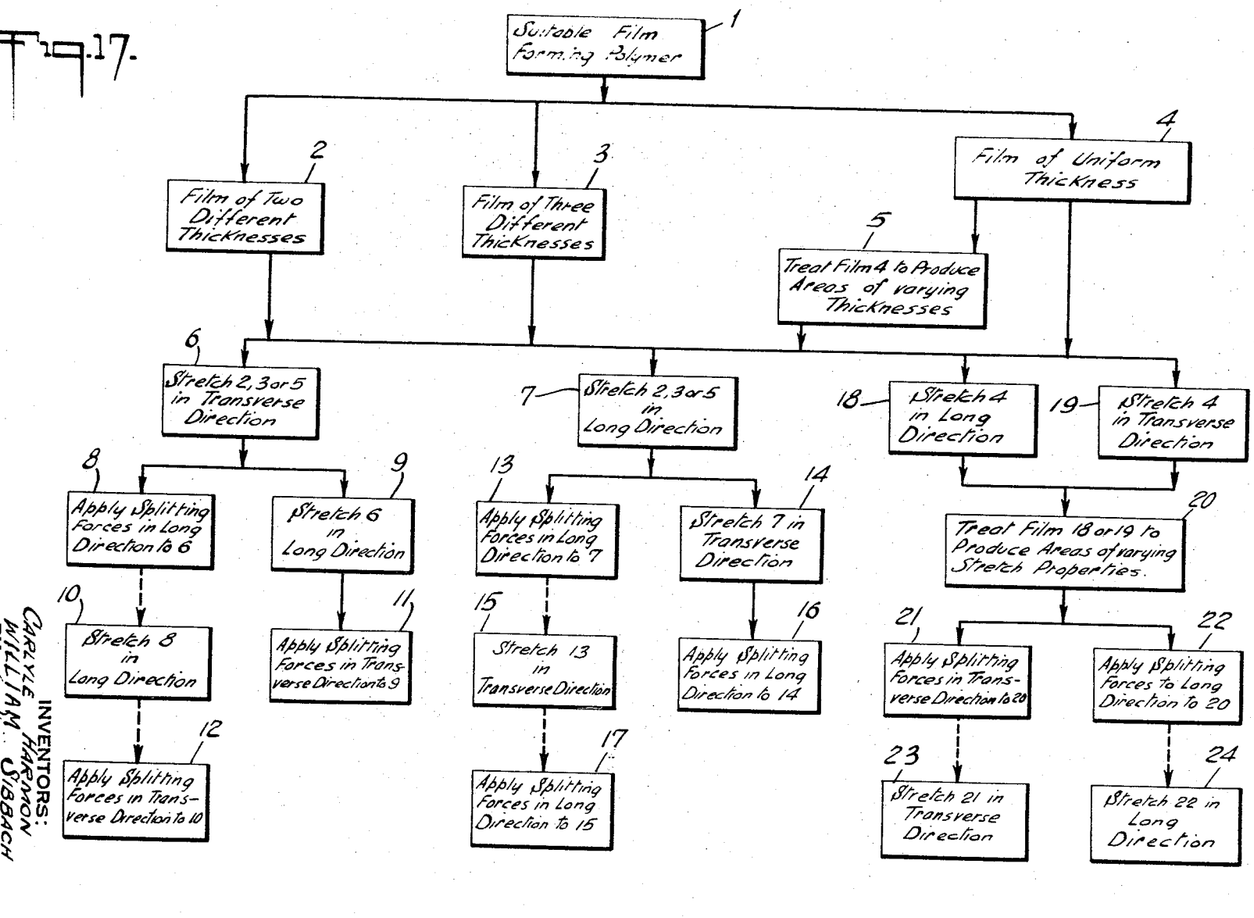
FIG. 17 is a schematic flow sheet of the process of the present invention showing the various steps in the process.

If a film of uniform thickness (box 4) is used, it may be treated to produce areas which have different stretch properties (box 5). This may be done by printing the film in a pattern with a cross-linking material and then curing the cross-linking material so that cross-linked polymer areas are formed which cannot be oriented. Another technique for treating the film is to place a dark compound, such as, black paint, on the film in various areas so that the film when heated prior to being stretched absorbs more heat in certain areas than in other areas, and hence, only the more heat-absorbing areas will become oriented. It is important that the film have a pattern of differential stretch which may be formed either by a physical process, such as embossing, heating, etc., or by a chemical process, such as cross-linking, etc.

The treated film (box 5) or the film of varying thickness (boxes 2 and 3) is strecthed either in the transverse (box 6) or longitudinal directions (box 7) to orient those areas most susceptible to orientation. The other areas may remain completely unoriented or may be partially oriented. Depending upon the pattern of highly oriented areas produced in the film, the film may be either split (box 8 or 13,) that is, treated with forces transverse to the direction of orientation to split the highly oriented areas into fibrous areas, or it may be oriented in the opposite direction of its first orientation (box 9 or 14) to orient other areas of the film in a direction 90 degrees to the first direction of orientation and then split (boxes 11 and 16). It is important that the splitting forces be applied transverse to the last direction of orientation, that is, if the film is stretched in a longitudinal direction, the splitting forces must be applied in the transverse direction.

Virtually any combination of one or more orientation steps (boxes 6 and 10 or 7 and 11) and one or more splitting steps (boxes 8 and 12 or 13 and 17) may be used. The only limit is that there should not be more splitting or fibrillating steps than there are orientation steps; however, there may be more orientation steps than there are fibrillating steps. As shown in FIG. 17, one stretching step (box 6) may be combined with one splitting step (box 8) or two stretching steps (boxes 6 and 9) may be followed by a splitting step (box 11). If desired, stretching steps (boxes 6 and 10) may be alternated with splitting steps (boxes 8 and 12). In those instances when you have a stretching step (box 10 or 15) after a splitting step (box 8 or 13), the stretching step will be in the same direction as the splitting forces have been applied, and hence, will open up the fibrous area and produce a more porous product. If only one stretching step is used in the process of the present invention, the oriented areas will be uniaxially oriented; however, if two stretching steps are used, there may be areas in the final product, dependent upon patterns used, which are biaxially oriented.

Generally, it is preferred to heat the film prior to orientation. When heating an unoriented film prior to stretching, temperatures of from about 150° F. and higher may be used depending on the polymer being processed, the amount of stretching, rate of stretching, etc. If heating a film already oriented in one direction, care must be taken not to use temperatures which will soften the polymer and reduce or destroy the already desired orientation.

In starting with films of uniform thickness (box 4), the films may be oriented in a single direction first (box 18 or 19), and treated in a pattern to reduce the orientation in that pattern (box 20) so that when the splitting forces are applied (box 21 or 22), the only areas affected in the film will be the highly oriented areas. The unoriented areas will be unaffected and remain in the final product. As previously described, such a treated film after being split into fibers may be stretched perpendicular to its original direction of orientation (box 23 or 24) to open up the fibrous areas and produce a more porous product.

Figure 18:
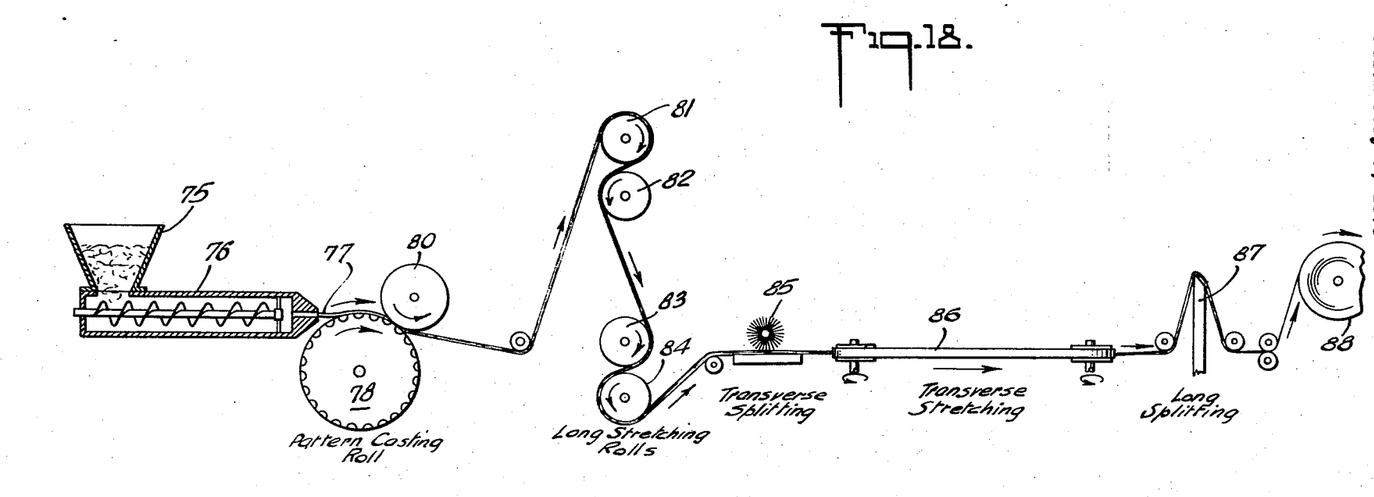
FIG. 18 is a schematic drawing of suitable apparatus for carrying out one embodiment of the process of the present invention.

Referring to FIG. 18, there is a schematic showing of apparatus for carrying out one embodiment of the process of the present invention. The suitable film-forming polymer is fed into the hopper 75 of a screw extruder 76 and the plastic film 77 extruded through the slit extrusion opening onto a patterned casting roll 78. The pattern roll is kept cool by internal cooling with chilled water and the film as cast is pressed by the pressure roll 80. The pattern on the casting roll is in the configuration as shown in FIG. 6 of the drawings. The film after being cast is passed about a series of long stretching rolls with the uppermost rolls 82 and 81 rotating at a slower speed than the lower rolls 83 and 84 so that the film is stretched in the longitudinal direction to highly orient the thin areas of the film and give a substantial orientation to the thicker longitudinal ribs of the film. The orientation in the thin areas may be 4:1, 10:1 or even as high as 15:1, but it must produce a highly uniaxially oriented area. The film is brushed with a wire brush 85 which in effect is applying forces transverse to the highly oriented areas of the film breaking these areas into fibers or what is commonly termed "fibrillating" these areas. The film is passed through a cross stretching apparatus 86 which is a tenter frame comprising diverging chains which grip the film at its outer edges and spread it widthwise. This widthwise spreading provides a substantial orientation in the transverse ribs. The areas defined by these oriented areas are fibrous areas. The sheet material is wound on a standard wide up rig 88 as known in the art.

Figure 19:
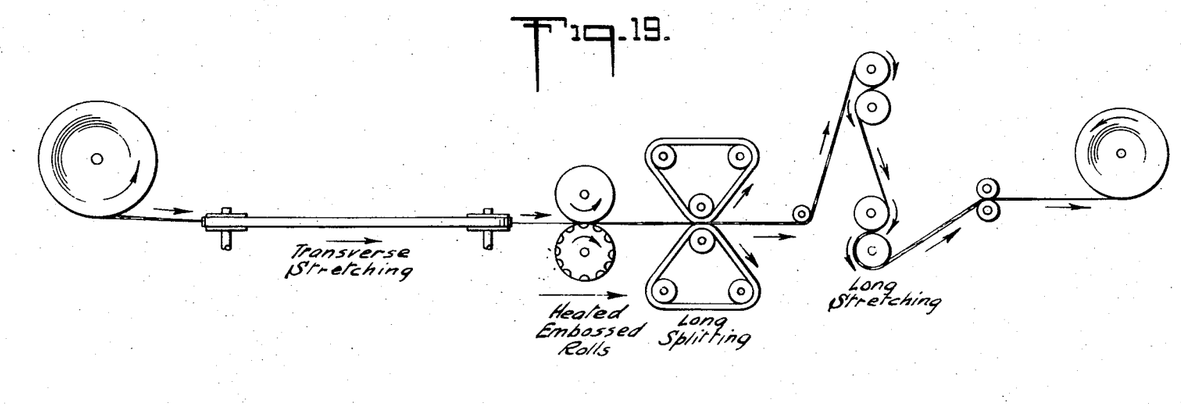
FIG. 19 is a schematic drawing of apparatus for carrying out another embodiment of the process of the present invention.

Referring to FIG. 19, there is also schematically shown other apparatus for carrying out another embodiment of the process of the present invention. In this embodiment a roll of uniform film 90 formed by any of the various known forming techniques is first transversely stretching by passing it through a tenter frame 91 comprising diverging chain conveyors which grip the edge of the film and stretch it transversely to a degree of orientation of from about 6 to 1 to 15 to 1 or higher. It is preferred that the film be heated prior to being stretched. The stretched film is passed between a pair of rolls 92 and 93, one of which has raised areas 94 which have been heated and which disrupt the orientation in those areas of the film which contact the raised heated areas. The film is passed between rubber belts 95 with the rubber belts placed under high compression which applies longitudinal forces to the film and splits those areas which remain highly oriented in the transverse direction into fibrous areas. The film is passed through a set of stretching rolls which comprise four rolls, the first two rolls 96 and 97 running at a slower speed than the latter two rolls 98 and 99 to stretch the film in the longitudinal direction to open up the fibrous areas and produce some orientation in the previously unoriented areas. The fabric 100 is then wound up for use as described.

The following are examples of sheet materials and methods according to this invention. It should be understood that they are offered only by way of illustration and not intended to define the breadth of the invention or limit the scope of the claims.

Example I

A linear, high-density polyethylene polymer is extruded through a die and cast onto a pattern casting roll. The pattern on the casting roll comprises longitudinal and transverse lines spaced ⅛ inch apart in both directions and having a depth of 7 mils. The film produced is a film of 3 mil thickness with transverse and longitudinal lines spaced ⅛ inch apart in both directions, 10 mils in thickness and 7 mils in width. The film is heated to 250° F. and stretched in its longitudinal direction at a 9:1 ratio to highly orient the thin areas and orient the thicker longitudinal ribs. The film is passed through a fibrillating apparatus comprising a rotating brush to split the highly oriented areas into fibrous areas. The partially split film is again heated to 250° F. and passed through a tenter frame to cross stretch the film in a ratio of 6:1 to partially orient the transverse ribs and produce sheet material as described in accordance with the present invention.

Example II

A linear polyethylene polymer is extruded and cast onto a pattern casting roll. The engraved pattern on the casting roll comprises longitudinal lines spaced 0.1 inch apart. The lines have a depth of 7 mils and are 10 mils wide on the face of the roll and 7 mils wide at the bottom of the engraving. The film produced is 3 mils thick with 10 mil thick longitudinal ribs. The film is heated to approximately 230° F. and stretched in its transverse direction at an 8 to 1 ratio to orient the thin areas between ribs. Longitudinal forces are applied to split the oriented areas into fibers. The film is heated to approximately 200° F. and stretched in the longitudinal direction at a 2 to 1 ratio to partially orient the thicker longitudinal ribs and open the fibrous areas to produce a sheet material having partially oriented longitudinal ribs connected by fibrous areas with the fibers being substantially oriented in the transverse direction of the sheet material.

Example III

A polypropylene polymer is extruded and cast onto a pattern casting roll. The pattern on the casting roll comprises two sets of engraved diagonal lines which cross each other at about 90°. The engraved lines are spaced ⅛ inch apart and are 30 mils wide and 10 mils deep. The film produced is 3 mils thick having a crossing diagonal pattern of thicker ribs. The film is heated to 300° F. and stretched in its longitudinal direction at a ratio of 10 to 1 to orient the thin areas. Splitting forces are applied in the transverse direction to form fibers in the thin areas. The film is stretched in the transverse direction at a ratio of 10 to 1. The resultant product is similar to the product depicted and described in conjunction with FIG. 14.

Having now described the invention in specific detail and exemplified the manner in which it may be carried into practice, it will be readily apparent to those skilled in the art that innumerable variations, applications, modifications and extensions of the basic principles involved may be made without departing from its scope. Thus, the sheet material of the present invention may be laminated with fabrics, paper, other materials or employed in a host of ways that will be readily apparent to one skilled in the art.

We claim:
1. A tear resistant sheet material comprising a predetermined pattern of film areas of a crystalline, orientable polymer, said film areas being interconnected by fibrous areas of substantially the same polymer, said fibrous areas comprising a multiplicity of fibers uniformly distributed throughout said area, each fiber having a denier less than 10 and a degree of orientation exceeding the degree of orientation of said film areas, whereby said sheet material has a soft, fluffy hand.
2. Sheet material according to claim 1, wherein the film areas are unoriented.
3. Sheet material according to claim 1, wherein a portion of the film areas are unoriented and the remaining film areas are oriented.
4. Sheet material according to claim 1, wherein the crystalline, orientable polymer is polyethylene.
5. Sheet material according to claim 1, wherein the crystalline, orientable polymer is polypropylene.
6. Sheet material according to claim 1, wherein some of the film areas are biaxially oriented.
7. Sheet material according to claim 1, wherein the pattern of film areas is discontinuous.

References Cited

UNITED STATES PATENTS

| | | | |
|---|---|---|---|
| 3,397,825 | 8/1968 | Wilkins | 225—3 |
| 3,137,746 | 6/1964 | Seymour et al. | 264—73 |
| 2,954,587 | 8/1960 | Rasmussen | 264—23 |
| 3,199,284 | 8/1965 | Scragg | 57—157 |
| 3,293,844 | 12/1966 | Wininger et al. | 57—157 |
| 3,386,876 | 6/1968 | Wyckoff | 161—402 |
| 3,387,077 | 6/1968 | Sammons et al. | 161—89 X |

DANIEL J. FOITSCH, Primary Examiner

U.S. Cl. X.R.

161—116, 123, 169, 172, 181, 402; 264—147, 288, 289, 291